United States Patent
Yamamoto et al.

[11] Patent Number: 5,911,426
[45] Date of Patent: Jun. 15, 1999

[54] FRONT WHEEL SUSPENSION FOR SMALL SIZE MOTOR VEHICLE

[75] Inventors: Kazuhiro Yamamoto; Takahito Sekita; Takeshi Yamazaki, all of Saitama, Japan

[73] Assignee: Honda Giken Kogyo Kabushiki Kaisha, Tokyo, Japan

[21] Appl. No.: 08/838,040

[22] Filed: Apr. 22, 1997

[30] Foreign Application Priority Data

Apr. 22, 1996 [JP] Japan ..................................... 8-135643

[51] Int. Cl.⁶ .............................. B62D 7/00; B62D 21/15
[52] U.S. Cl. .......................... 280/124.128; 280/124.153; 280/784; 180/65.1
[58] Field of Search ..................................... 280/784, 788, 280/771, 846, 93, 95.1, 690, 93.507, 93.502, 93.51, 93.514, 124.128, 124.15, 124.134, 124.153; 180/65.1

[56] References Cited

U.S. PATENT DOCUMENTS

| | | | |
|---|---|---|---|
| 1,803,055 | 4/1931 | Causan | 280/788 |
| 2,715,032 | 8/1955 | Gregory | 280/788 |
| 2,760,787 | 8/1956 | Muller | |
| 4,140,333 | 2/1979 | Thoraval et al. | 280/721 |
| 4,383,587 | 5/1983 | Lang | 180/435 |
| 4,473,238 | 9/1984 | Antoine | 280/721 |
| 4,593,930 | 6/1986 | Davis | 280/690 |
| 4,652,011 | 3/1987 | Hollerweger et al. | 280/846 |
| 5,555,950 | 9/1996 | Harada et al. | 280/784 |

FOREIGN PATENT DOCUMENTS

| | | |
|---|---|---|
| 1154356 | 4/1958 | France . |
| 2439095 | 5/1980 | France . |
| 2111407 | 9/1972 | Germany . |
| 655480 | 7/1951 | United Kingdom . |
| 2150090 | 6/1985 | United Kingdom . |

Primary Examiner—Paul N. Dickson
Attorney, Agent, or Firm—Birch, Stewart, Kolasch & Birch, LLP

[57] ABSTRACT

To increase the shock absorbing stroke of a front portion of a body frame. Side beams and a central beam, which extend longitudinally of a motor vehicle, are disposed forwardly of a cross member and between left and right front wheels. Front portions of left and right leading arms are curved outwardly of the side beams. When a shock is applied, the front portions of the leading arms are bent laterally outwardly, displacing the front wheels outwardly of the cross member.

18 Claims, 7 Drawing Sheets

FRONT WHEEL SUSPENSION FOR SMALL SIZE MOTOR VEHICLE

BACKGROUND OF THE INVENTION

1. Field of the Invention

The present invention relates to a small-size motor vehicle which is suitable for carrying one or two persons and operating in an urban area.

2. Description of Background Art

Generally leading-arm front wheel suspensions have a leading arm extending substantially linearly in the longitudinal direction of the motor vehicle and a front shock absorber mounted on a front end portion thereof near the axle of the front wheel. A steering gearbox is also disposed in the vicinity of the axle of the front wheel.

If a highly rigid body frame is positioned rearwardly of the treads of the left and right front wheels, then the body frame must keep a sufficient distance (shock absorbing stroke) for the front wheels to traverse to absorb the shocks without obstructing the retraction of the front wheels when shocks are to be absorbed.

In the case where a front portion of the motor vehicle body is used to absorb shocks, if the leading arms are not curved but are straight or the front shock absorber and the steering box in the vicinity of the axle of the front wheel obstruct the bending of the leading arms and the movement of the front wheel, the shock energy cannot be absorbed by the leading arms. Thus, the shock is transmitted to the body.

Maintaining a shock absorbing stroke is important especially for small-size motor vehicles which have a short overall length.

SUMMARY AND OBJECTS OF THE INVENTION

To solve the above problems, there is provided in accordance with the present invention a front wheel suspension for a small-size motor vehicle having a front portion of a body, the front body comprising a pair of side portions of a main frame and a front cross member. Leading arms extend forwardly from the body frame and support respective front wheels. The treads of the front wheels and said cross member are in superposed positional relation to each other as viewed from the front and each of said leading arms has a substantially doglegged shape as viewed in plan extending forwardly from an innermost side of an attachment on the frame and are curved laterally outwardly from an intermediate portion thereof.

Front shock absorbers may be mounted on attachments provided on the leading arms on the side of the supporting point side from the curved portions.

Side beams may extend forwardly and may be disposed between left and right leading arms.

A steering gearbox may be disposed rearwardly of a central position of the front wheels. Tie rods may be opened outwardly and forwardly in a V-shape as viewed in a plan view. The tie rods are disposed for steering the front wheels. The tie rods are disposed substantially parallel to the curved portions of the leading arms.

The tie rods may be attached to the steering gearbox at portions thereof which are disposed in the vicinity of a transverse center of a transversely elongate member which is disposed to couple opposite ends of the steering gearbox which is of the rack and pinion type to each other.

With the front portions of the leading arms spreading outwardly in a substantially doglegged shape, when a shock is applied to the front wheels upon collision, the leading arms are largely deformed outwardly about their bent portions, displacing the front wheels outwardly out of interference with the cross member behind the front wheels. Since a sufficient long shock absorbing stroke is maintained, even a small-size motor vehicle can effectively absorb the shock energy.

The front shock absorbers are not coupled to the leading arms forward of the curved portions thereof. In addition, the steering gearbox is disposed rearwardly of the curved portions of the leading arms. Therefore, the front shock absorber or the steering gearbox does not obstruct the deformation of the leading arms.

The side beams disposed between the left and right leading arms and the leading arms do not obstruct each other because the compression direction of the side beams and the curving direction of the leading arms are different from each other upon absorption of the shock.

The tie rods, which extend substantially parallel to the curved portions of the leading arms, are stretched outwardly and thereby they do not obstruct the leading arms without contacting the front wheel with the crossmember when the leading arms are deformed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
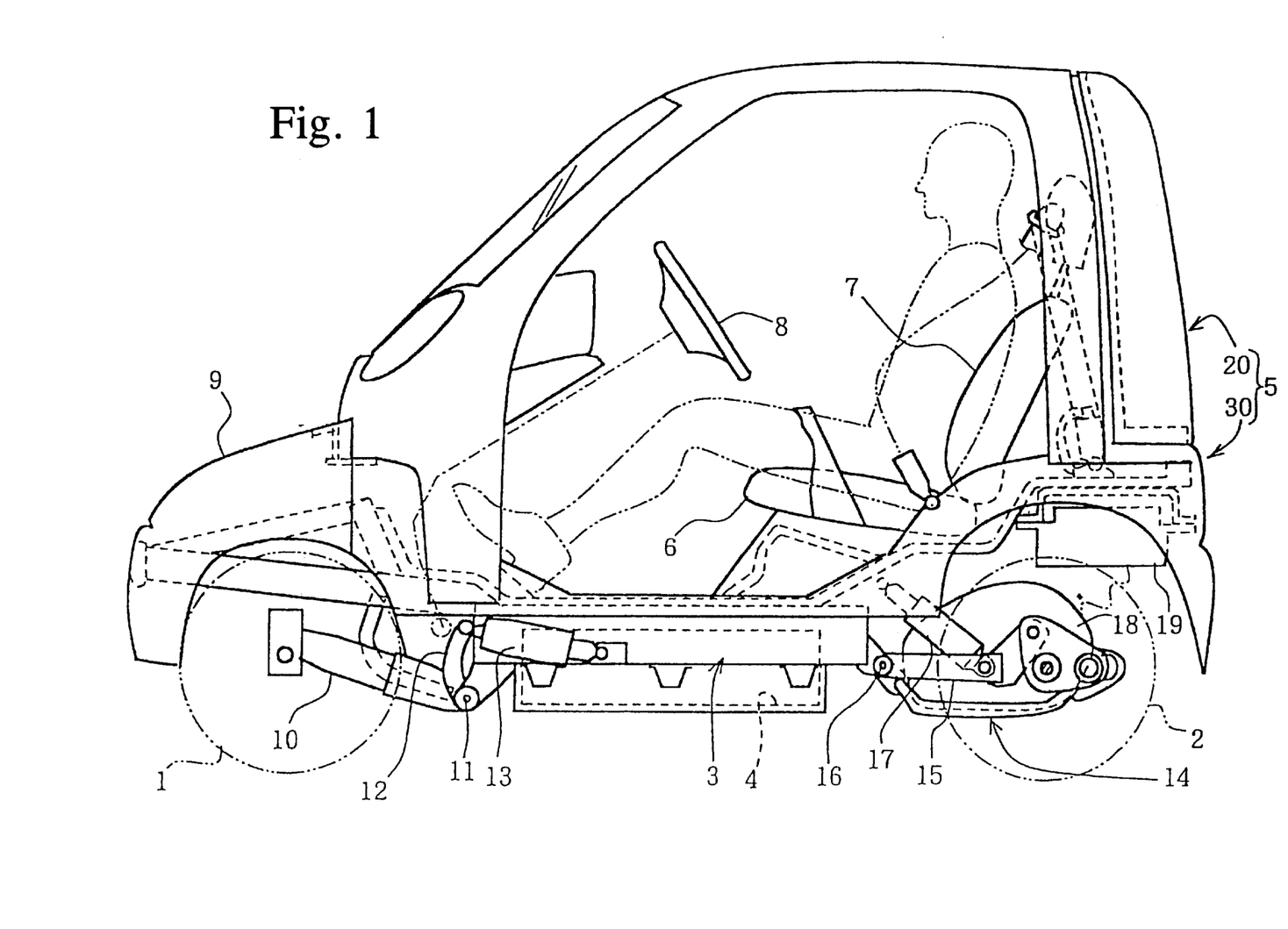
FIG. 1 is a side elevational view of a one-seat electric vehicle which is a small-size motor vehicle to which the present invention is applied.

As shown in FIG. 1, the small-size motor vehicle has a body frame 3 disposed between a pair of left and right front wheels 1 and a pair of left and right rear wheels 2. A battery 4 is supported on the body frame 3. A body 5, having a vertically integral structure which provides a cabin, is provided wherein the body 5 is supported on the body frame 3.

The body 5 has large openings defined, respectively, in left and right sides thereof. The body 5 has an interior space serving as a passenger's compartment in which a seat cushion 6 and a seatback 7 are disposed. A steering wheel 8 is positioned in front of the seat cushion 6 and the seatback 7. The body 5 has a front portion covered with a detachable front fender 9.

The front wheels 1 are swingably supported on the front portion of the body frame 3 by a pair of respective left and right leading arms 10 for swinging movement about pivots 11.

Cushion arms 12 project integrally upwardly from the leading arms 10 near the pivots 11. Front shock absorbers 13 are connected between the front cushion arms 12 and sides of the body frame 3.

The rear wheels 2 are swingably supported on a rear portion of the body frame 3 by a pair of respective left and right trailing arms 15 for swinging movement about pivots 16. Rear shock absorbers 17 are connected between the trailing arms 15 and a rear end portion of the body frame 3.

A power device 18 having an electric motor is supported on the swing axle. The power device 18 and the trailing arms 15 jointly make up a vertically swingable power unit 14.

A controller 19 is suspended from and supported on a rear end of the body 5 above the power device 18. The controller 19 is a known device which comprises a microcomputer, etc. for controlling its output to the electric motor of the power device 18.

A high-voltage power cable extends directly between the controller 19 and the power device 18, without passing through the body 5.

Figure 2:
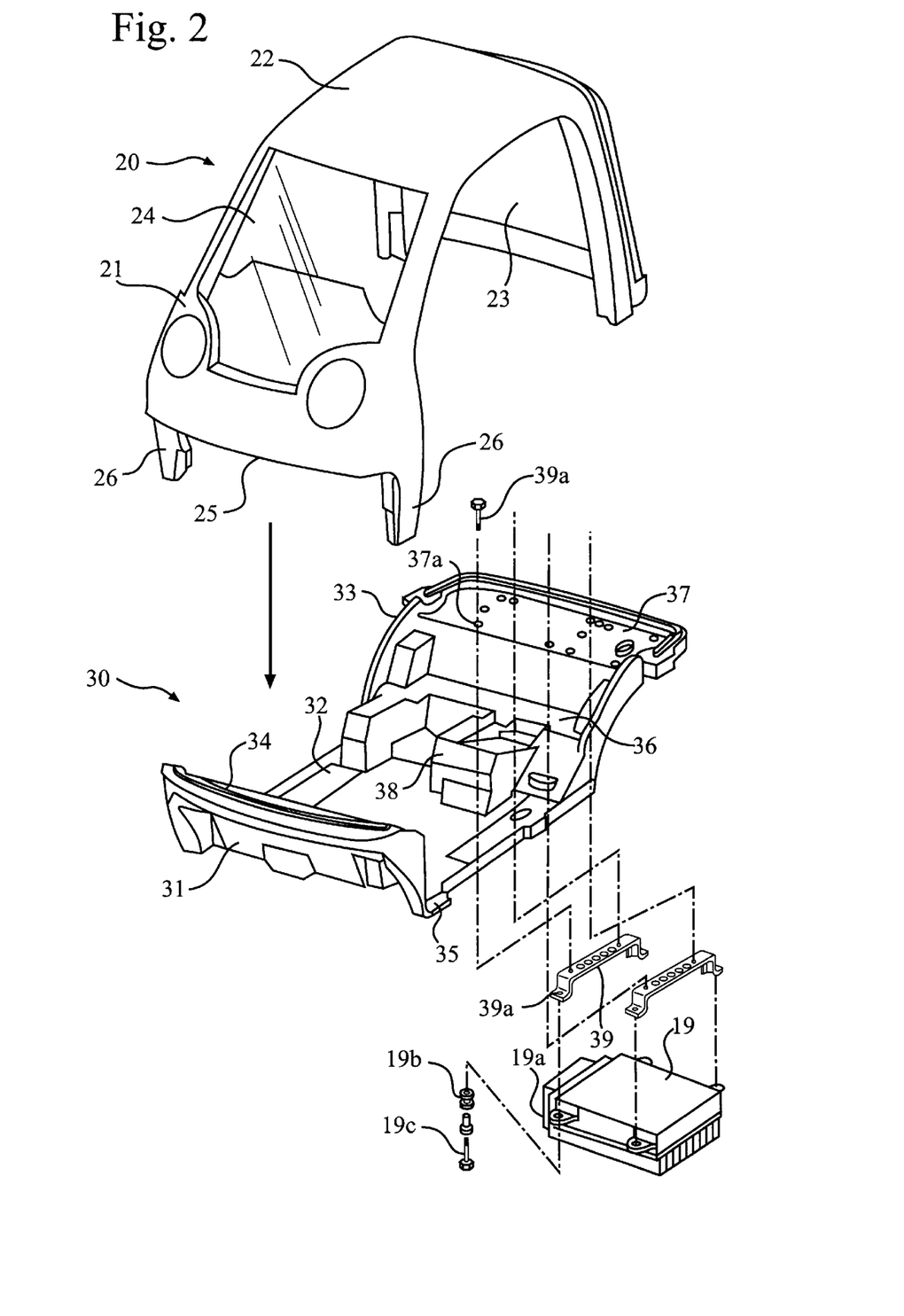
FIG. 2 is an exploded perspective view of a cabin of the one-seat electric vehicle.

As shown in FIG. 2, the body 5 is of an integral unitary structure made of resin and comprising an upper cabin 20 and a lower cabin 30.

The upper cabin 20 has a substantially arch-shaped structure, as viewed from the side elevation. A front portion 21, a roof 22 and a rear portion 23 form the upper cabin 20. The roof 22 and the rear portion 23 are each in the form of a panel.

The front portion 21 has a window 24 fitted with a panel of glass, and a pair of attachments 26 extending downwardly from respective left and right sides of a lower edge 25 thereof.

The lower cabin 30 comprises a front portion 31, a floor 32, and a rear extension 33. The front portion 31 rises forwardly and has an upper edge 34 bonded to the lower edge 25 of the upper cabin 20.

The attachments 26 are held against and bonded to recesses 35 which are defined in the floor 32 in the vicinity of the front portion 31.

The rear extension 33 comprises a front inclined portion 36 extending obliquely rearwardly and upwardly. An overhang portion 37 extends rearwardly from an upper end of the front inclined portion 36 and is substantially horizontal.

The floor 32 is placed on and supported by the body frame 3. The floor 32 has a seat attachment 38 projecting integrally from a rear portion thereof to the inclined portion 36. The seat cushion 6 is mounted on the seat attachment 38.

The overhang portion 37 has attachment holes 37a through which bolts 39a extend vertically to fasten hangers 39 to a lower surface of the overhang portion 37.

The controller 19 has attachment lugs 19a on its sides which are fastened to the hangers 39 by bolts 19c that are threaded through the attachment lugs 19a and vibration-damping rubber members 19b and positioned into attachment holes 39a which are defined in opposite ends of the hangers 39.

Figure 3:
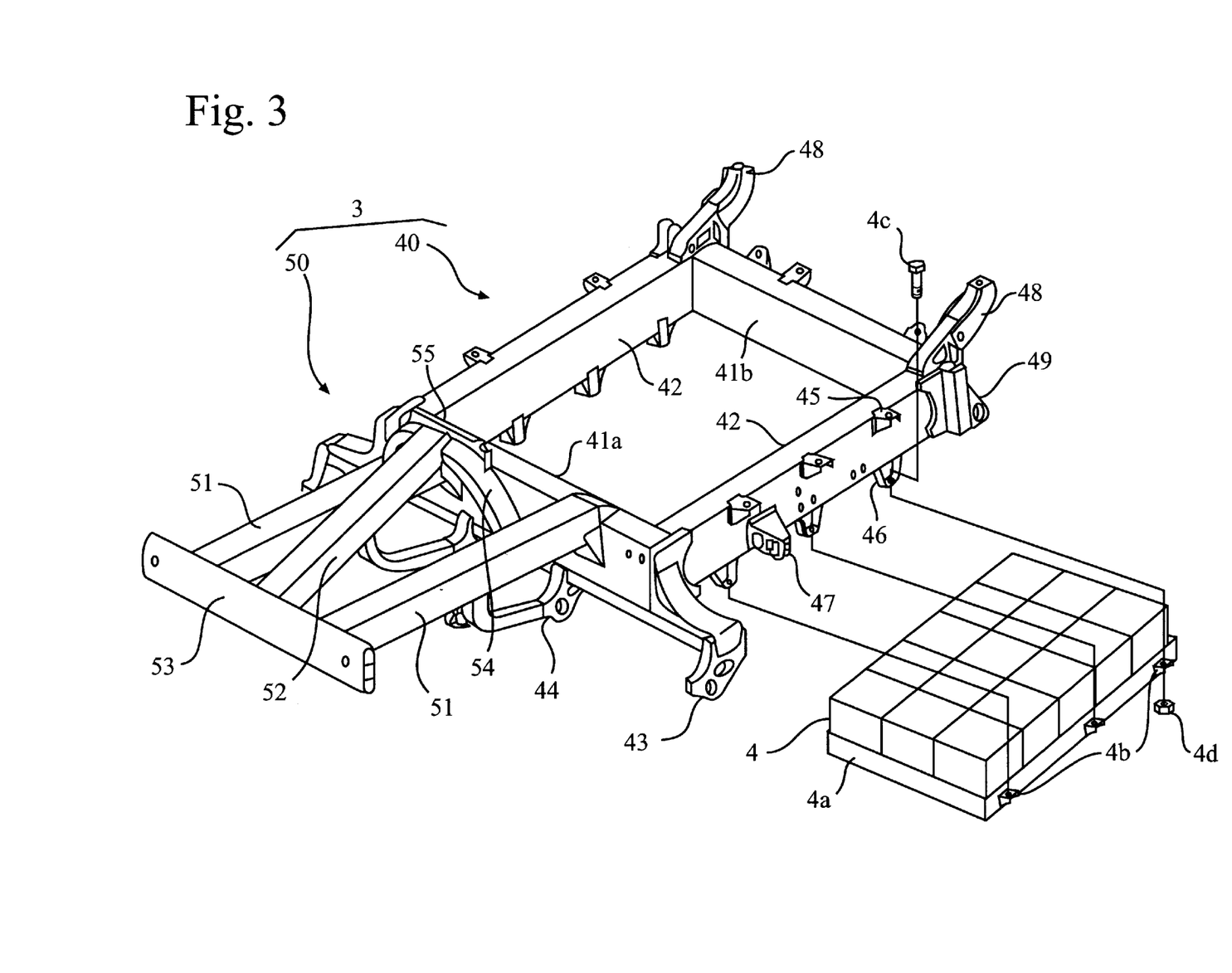
FIG. 3 is a perspective view of a body frame in its entirety.

As shown in FIG. 3, the body frame 3 has a substantially square rectangular frame 40 made of a highly rigid metal such as aluminum (angular pipe) or the like, and a shock absorbing portion 50 joined to a front portion of the rectangular frame 40.

The rectangular frame 40 comprises front and rear cross members 41a, 41b and side members 42 which are joined together into a substantially square-shaped structure. A pair of pivot support arms 43 project obliquely downwardly from laterally opposite ends of the cross member 41a, and a pair of pivot support arms 44 is mounted on an intermediate portion of the cross member 41a.

Stays 45 for installing the lower cabin 30 thereon and stays 46 for supporting the battery 4 are mounted respectively on upper and lower portions of the side members 42. Shock absorber brackets 47 for supporting the respective rear ends of the front shock absorber 13 are mounted on respective intermediate portions of the outer side surfaces of the side members 42.

The battery 4 is mounted on a tray 4a which is accommodated in a square space defined by the rectangular frame 40. Attachment lugs 4b on sides of the tray 4a are placed respectively on the stays 46, and fastened thereto by bolts 4c and nuts 4d.

Shock absorber brackets 48 which project obliquely upwardly and rearwardly are mounted on respective upper portions of the laterally opposite ends of the cross member 41b, and stays 49 project obliquely downwardly and rearwardly from respective lower portions of the laterally opposite ends of the cross member 41b.

The shock absorbing portion 50 comprises a pair of left and right side beams 51 extending obliquely upwardly and forwardly from opposite end portions of the cross member 41a, and a central beam 52 is disposed intermediate between and parallel to the side beams 51 and extends obliquely upwardly and rearwardly.

The pivot support arms 44 have distal ends connected to respective side surfaces of intermediate portions of the side beams 51.

The side beams 51 and the central beam 52 have respective distal ends joined to bumper 53. The central beam 52 has a rear end supported on left and right joint members 54 which extend vertically in a curved shape from the side beams 51.

A single shock distribution plate 55 which is of a substantially semicircular shape is attached to the joint between the rear end of the central beam 52 and the joint members 54.

Figure 4:
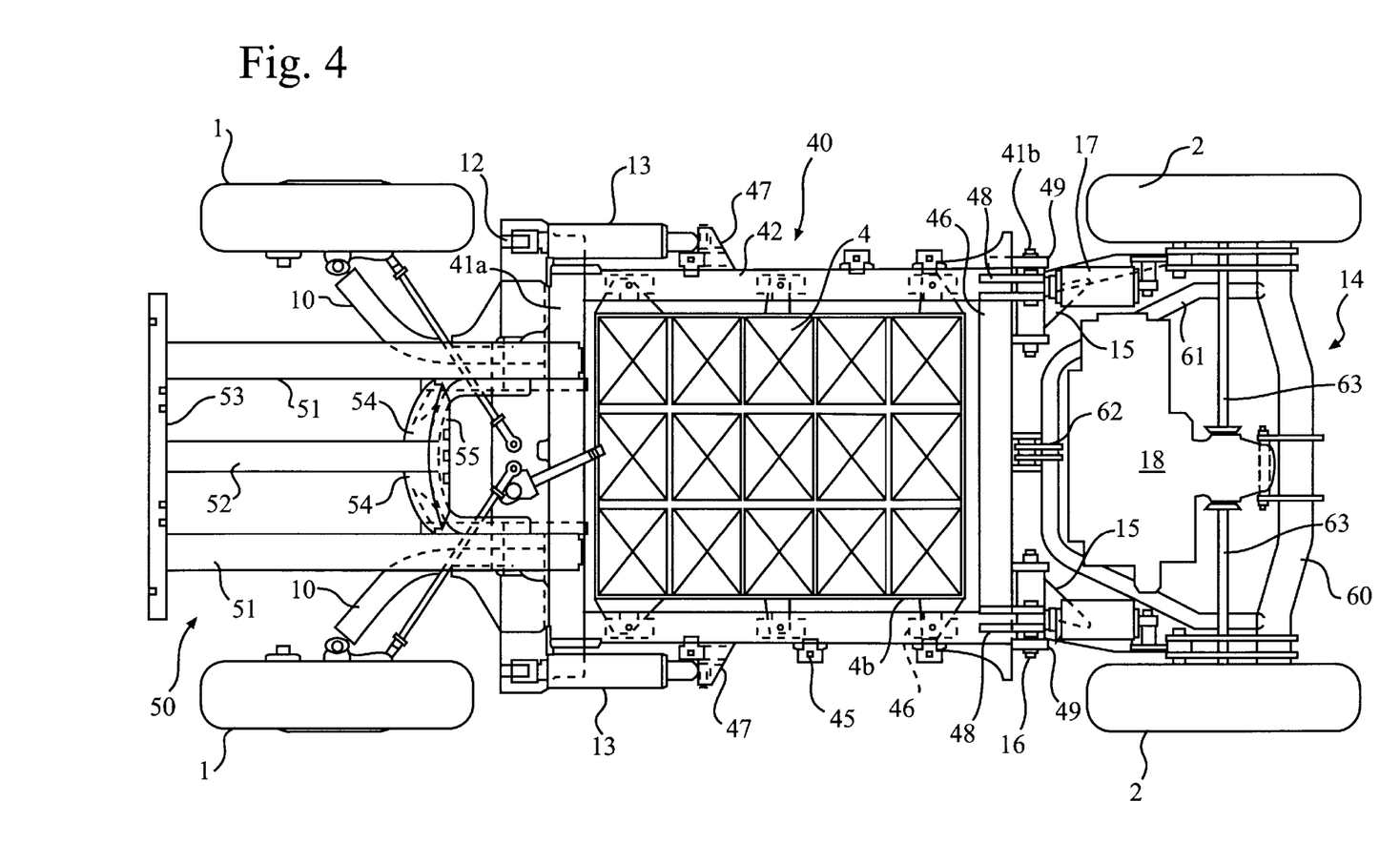
FIG. 4 is a plan view of the body frame and front and rear wheel suspensions.
Figure 5:
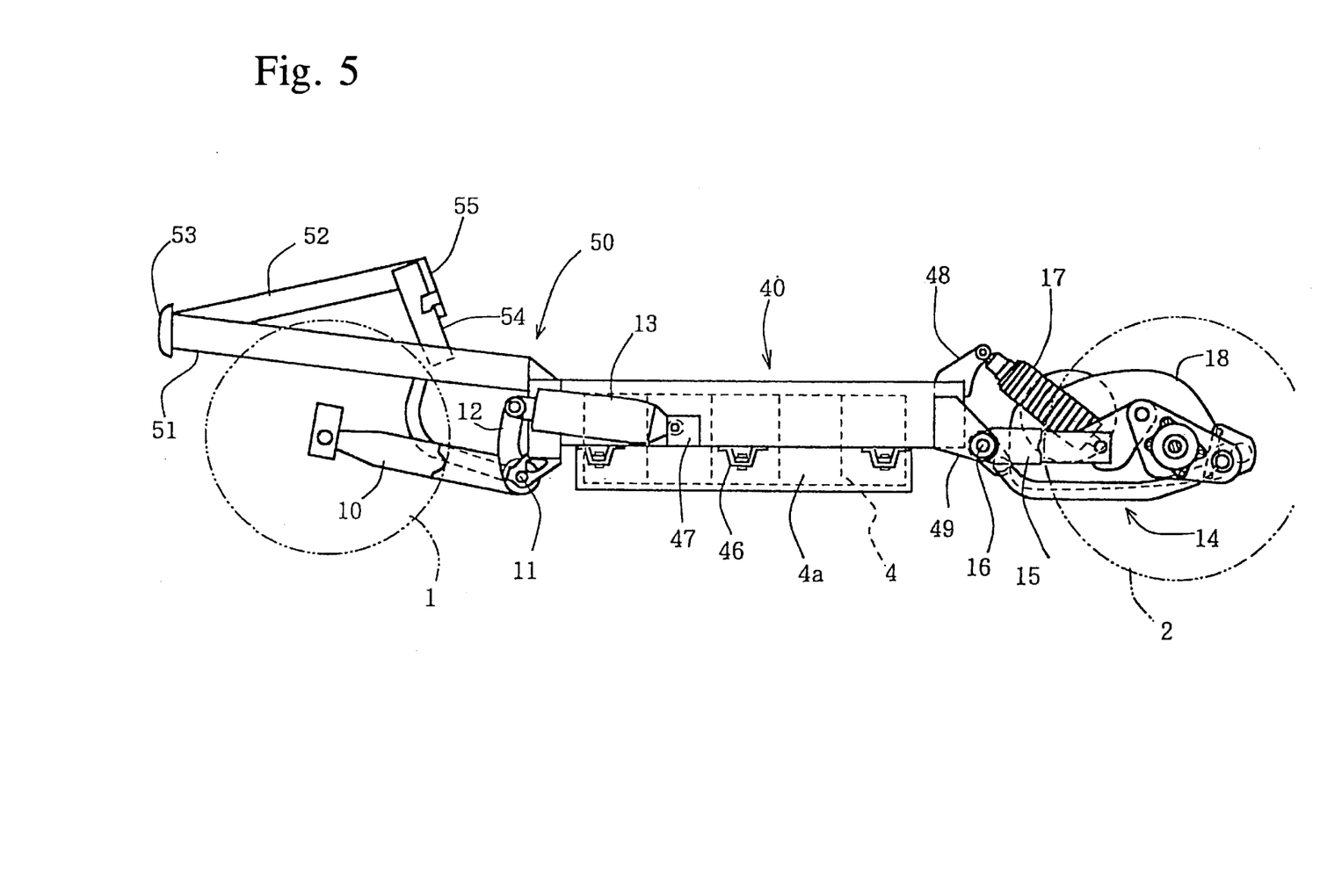
FIG. 5 is a side elevational view of the body frame and the front and rear wheel suspensions.

As shown in FIGS. 4 and 5, the leading arms 10 have respective rear ends pivotally supported between adjacent pairs of the pivot support arms 43 and the pivot support arms 44 in a front wheel suspension.

The rear shock absorber 17 has distal ends supported, respectively, on projecting ends of the shock absorber brackets 48 on the cross member 41b in a rear wheel suspension.

The trailing arms 15 have front ends pivotally supported on the lower stays 49, and the pivots 16 are positioned centrally on the pivotally supported front ends of the trailing arms 15.

The vertically swingable power unit 14 has a cross pipe 60 interconnecting respective rear ends of the trailing arms 15, and a lower pipe 61 for supporting a lower portion of the power device 18. The lower pipe 61 has a front central portion supported on the cross member 41b by a link plate 62 at a position coaxial with the pivots 16. The left and right rear wheels 18 can be rotated by axles 63 which can be rotated by the power device 18.

Figure 6:
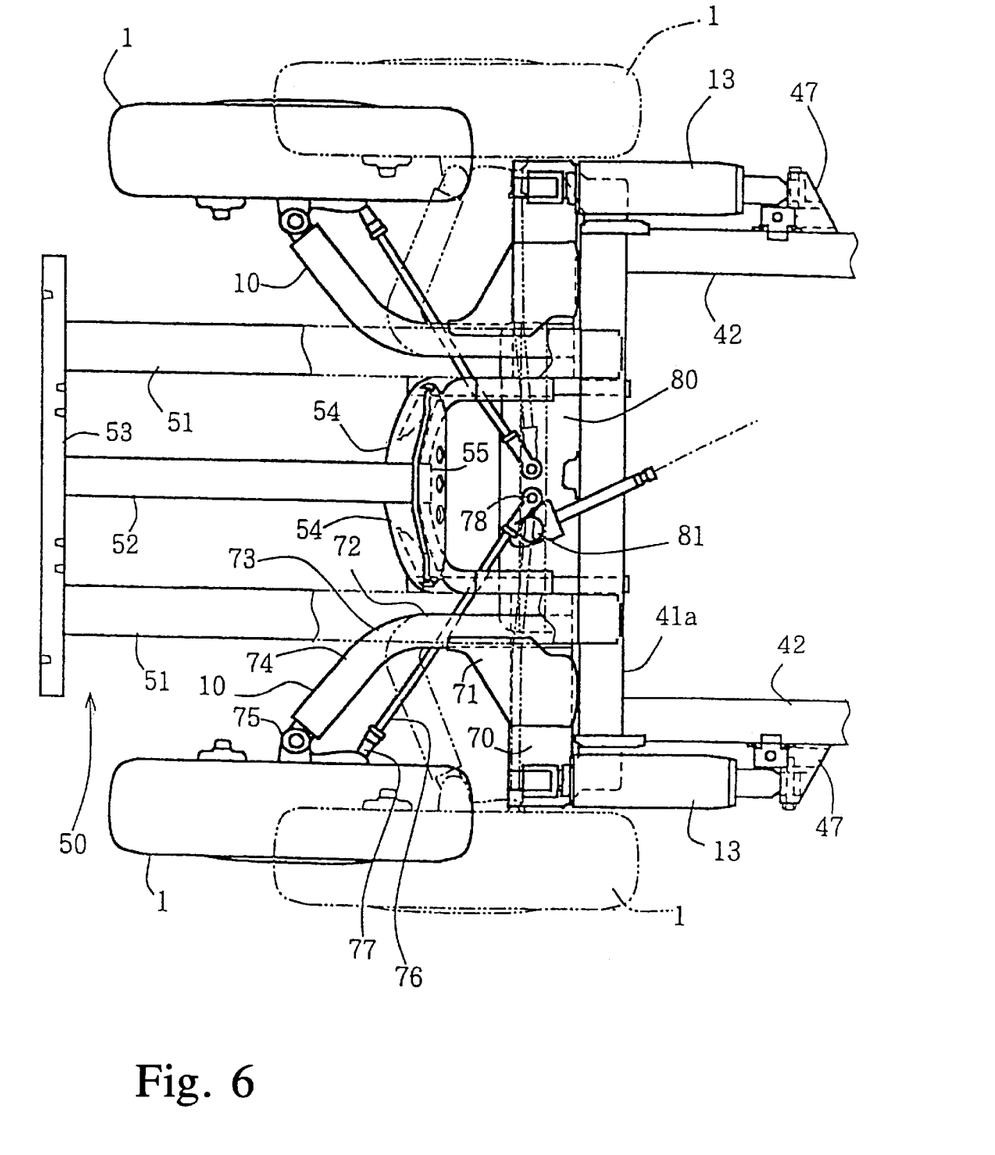
FIG. 6 is a plan view of the front wheel suspension.
Figure 7:
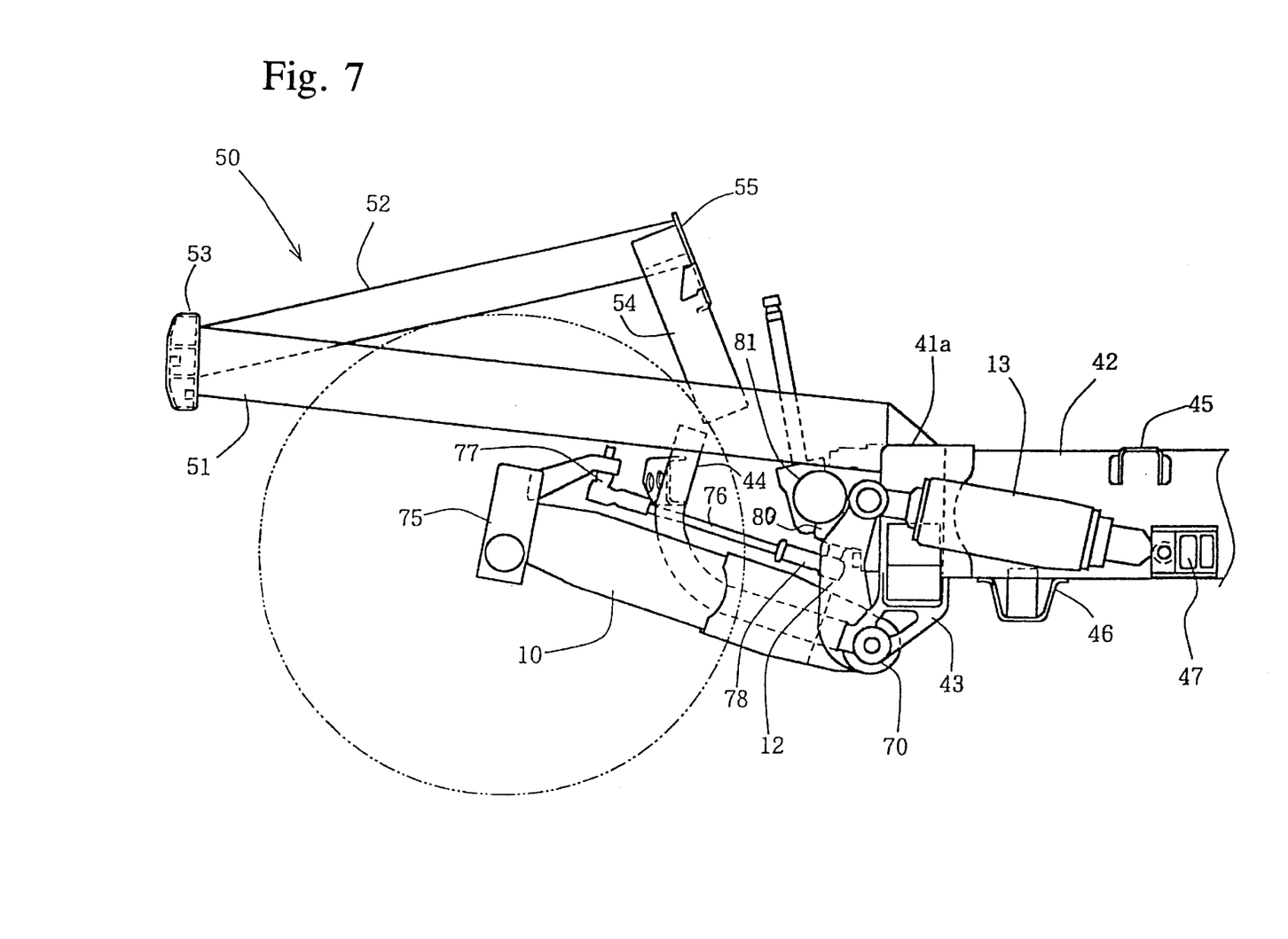
FIG. 7 is a side elevational view of the front wheel suspension.

FIG. 6 is a plan view of the front wheel suspension. FIG. 7 is a side elevational view of the front wheel suspension. As illustrated in FIGS. 6 and 7, the leading arms 10 have pivot shafts 70 on their rear ends angularly movably supported between the outer pivot support arms 43 and the inner pivot support arms 44. The joints between the pivot shafts 70 and the leading arms 10 are reinforced by gussets 71.

The front shock absorbers 13 include front ends positioned above the pivot shafts 70, and extend substantially the full length thereof along the outer sides of a front portion of the rectangular frame 40.

The leading arms 10 have proximal portions thereof serving as straight portions 72 overlapping the side beams 51 as viewed in plan and extending forwardly parallel to the side beams 51, and also have substantially intermediate portions as bent portions 73. Portions of the leading arms 10 forward of the bent portions 73 are curved outwardly into curved portions 74 disposed outwardly of the side beams 51. Therefore, each of the leading arms 10 has a substantially doglegged shape as a whole.

Knuckles 75 are mounted respectively on distal ends of the curved portions 74. The curved portions 74 are coupled to the respective front wheels 1 by the knuckles 75. The knuckles 75 are positioned inwardly of the lateral width of the cross member 41a as viewed in plan, and forwardly of the cross member 41a as viewed from the side elevation.

Therefore, the treads of the front wheels 1 and the cross member 41a overlap each other as viewed from the front.

Front joints 77 of tie rods 76 are connected to a substantially transverse center of a steering gearbox 80 in the vicinity of the center of the body 5.

The steering gearbox 80 is a member for supporting a rack-and-pinion steering gear mechanism 81. The steering gearbox 80 is of an elongate shape which extends laterally along the entire surface of the cross member 41a.

The tie rods 76 are provided as a pair of left and right tie rods spreading outwardly in the shape of a "V" with the open end extending forwardly as viewed in plan. Each of the tie rods 76 is inclined to extend substantially parallel to one of the curved portions 74 of the leading arms 10.

The operation of the embodiment will be described as follows. In FIG. 6, the front wheels 1 and the leading arms 10 shown in the solid-line positions are in a normal condition. When the bumper 53 hits an obstacle, the side beams 51 and the central beam 52 transmits the shock to the rectangular frame 40.

At this time, the shock absorbing portion 50 is retracted because the side beams 51 and the central beam 52 are plastically deformed such that they are compressed rearwardly.

As a result, when a shock is applied to the front wheels 1, the leading arms 10, which spread outwardly in their original configuration, are largely bent about the bent portions 73.

The leading arms 10 are then bent as indicated by the imaginary lines, and the front wheels 1 are displaced outwardly out of interference with the side beams 51 and the central beam 52 and the cross member 41a of the rectangular frame 40.

Therefore, the side beams 51 and the central beam 52 are continuously plastically deformed in the compressed direction without being obstructed by the front wheels 1, over a sufficiently long deformation stroke up to the cross member 41a. Consequently, the side beams 51 and the central beam 52 can absorb the applied shock without transmitting them substantially to the rectangular frame 40. Therefore, a small-size motor vehicle can maintain a sufficient shock absorbing stroke.

Since the front joints 77 of the tie rods 76 are disposed rearwardly of the knuckles 75 and extend parallel to the curved portions 74 of the leading arms 10, the tie rods 76 are stretched outwardly when the leading arms 10 are deformed and thereby they do not interfere with the leading arms 10 without contacting the front wheel with the cross member 41a.

The side beams 51 and the central beams 52 are disposed between the left and right leading arms 10. Therefore, the side beams 51 and the central beams 52 do not obstruct the plastic deformation of the leading arms 10.

The front shock absorbers 13 are not coupled to the curved portions 74 of the leading arms 10 and are disposed rearwardly of the pivot shafts 70 on the rear ends of the leading arms 10. Thus, the front shock absorber 13 do not obstruct the deformation of the leading arms 10.

In addition, since no large members are disposed in at least a front portion of the shock absorbing portion 50 forward of the distal ends of the leading arms 10, no such large members obstruct the deformation of the leading arms 10.

The invention being thus described, it will be obvious that the same may be varied in many ways. Such variations are not to be regarded as a departure from the spirit and scope of the invention, and all such modifications as would be obvious to one skill in the art are to be included within the scope of the following claims.

What is claimed is:

1. A front wheel suspension for a small-size motor vehicle comprising:

a body frame including a main frame having a pair of side portions and a front cross member being mounted on a front portion of said body frame;

leading arms extending forwardly from said body frame;

a front wheel operatively mounted on each of said leading arms;

said front wheels and said front cross member being only partially in overlapping superimposed positional relation to each other as viewed from the front, and when the wheels are straight;

each of said leading arms has a substantially curved shape as viewed in plan extending forwardly from the body frame and curved laterally outwardly from an intermediate portion of said leading arm forming a curved portion, wherein a predetermined shock force applied to said leading arms displaces said front wheels laterally for avoiding engagement with said front cross member; and said front wheels extend sufficiently beyond an outside edge of said front cross member to avoid engagement with said front cross member upon the application of the predetermined shock force to said leading arms, said leading arms bending at said curved portions to move said front wheels further beyond said outside edge of said front cross member.

2. The front wheel suspension for a small-size motor vehicle according to claim 1, and further including front shock absorbers mounted on attachments provided on the leading arms on a side of a supporting point from the curved portions.

3. The front wheel suspension for a small-size motor vehicle according to claim 1, and further including side beams extending forwardly and being disposed between left and right leading arms.

4. The front wheel suspension for a small-size motor vehicle according to claim 1, and further including a steering gearbox disposed rearwardly of a central position of the front wheels, and tie rods for steering the front wheels, said tie rods being opened outwardly, forwardly in a V-shape as viewed in a plan view and disposed substantially parallel to the curved portions of the leading arms.

5. The front wheel suspension for a small-size motor vehicle according to claim 4, wherein the tie rods are attached to the steering gearbox at portions thereof and are disposed in the vicinity of a transverse center of a transversely elongate member disposed to couple opposite ends of the steering gearbox to each other.

6. The front wheel suspension for a small-size motor vehicle according to claim 2, wherein each of said attachments is a front arm having a first end secured to one of said leading arms and a second end projecting upwardly therefrom, said shock absorbers each being secured at one end to said body frame and at a second end to said second end of said front arm.

7. The front wheel suspension for a small-size motor vehicle according to claim 1, wherein said curved portion of said leading arms is bendable to permit said front wheels to be displaced out of engagement with said cross member when a predetermined shock is applied thereto.

8. The front wheel suspension for a small-size motor vehicle according to claim 1, wherein each of said leading arms includes a first end secured at a position offset from a central position of said front cross member and a second end secured to said front wheels, said curved shape of said leading arms enables the front wheels to be displaced laterally when a predetermined shock is applied thereto to avoid engagement of the front wheels with the front cross member.

9. The front wheel suspension for a small-size motor vehicle according to claim 4, and further including a front joint, said tie rods being mounted to said front joint and are secured at a position to the rear of said leading arms to avoid interference therewith when a predetermined shock is applied to said front wheels.

10. The front wheel suspension for a small-size motor vehicle according to claim 3, wherein said side beams are disposed between said leading arms to avoid interference therewith when a predetermined shock is applied to said front wheels.

11. The front wheel suspension for a small-size motor vehicle according to claim 1, further comprising side beams extending forwardly from said front cross member, at least a portion of said leading arms being in overlapping relationship to said side beams as viewed in plan.

12. The front wheel suspension for a small-size motor vehicle according to claim 11, further comprising:
   a central beam extending from said front cross member between said side beams; and
   a bumper attached to remote ends of said side beams and said central beam.

13. The front wheel suspension for a small-size motor vehicle according to claim 1, wherein said side portions of said main frame are located between said front wheels and in a non-overlapping manner with said front wheels when viewed in plan.

14. A front wheel suspension for a small-size motor vehicle comprising:
   a body frame including a main frame having a pair of side portions and a front cross member being mounted on a front portion of said body frame;
   leading arms extending forwardly from said body frame;
   a front wheel operatively mounted on each of said leading arms;
   said front wheels and said front cross member being at least partially in overlapping superimposed positional relation to each other as viewed from the front;
   side beams extending forwardly from said front cross member, at least a portion of said leading arms being in overlapping relationship to said side beams as viewed in plan;
   a central beam extending from said body frame between said side beams;
   a bumper attached to remote ends of said side beams and said central beam; and
   each of said leading arms has a substantially curved shape as viewed in plan extending forwardly from the body frame and curved laterally outwardly from an intermediate portion of said leading arm, wherein a predetermined shock force applied to said leading arms displaces said front wheels laterally for avoiding engagement with said front cross member.

15. The front wheel suspension for a small-size motor vehicle according to claim 14, and further including a steering gearbox disposed rearwardly of a central position of the front wheels, and tie rods for steering the front wheels, said tie rods being opened outwardly, forwardly in a V-shape as viewed in a plan view and disposed substantially parallel to the curved portions of the leading arms.

16. The front wheel suspension for a small-size motor vehicle according to claim 15, wherein the tie rods are attached to the steering gearbox at portions thereof and are disposed in the vicinity of a transverse center of a transversely elongate member disposed to couple opposite ends of the steering gearbox of the rack-and-pinion type to each other.

17. The front wheel suspension for a small-size motor vehicle according to claim 14, wherein said front wheels extend sufficiently beyond an outside edge of said front cross member to avoid engagement with said front cross member upon the application of a predetermined shock force to said leading arms, said leading arms bending at said curved portions to move said front wheels further beyond said outside edge of said front cross member.

18. The front wheel suspension for a small-size motor vehicle according to claim 14, wherein said side portions of said main frame are located between said front wheels and in a non-overlapping manner with said front wheels when viewed in plan.

* * * * *